Figure 1:
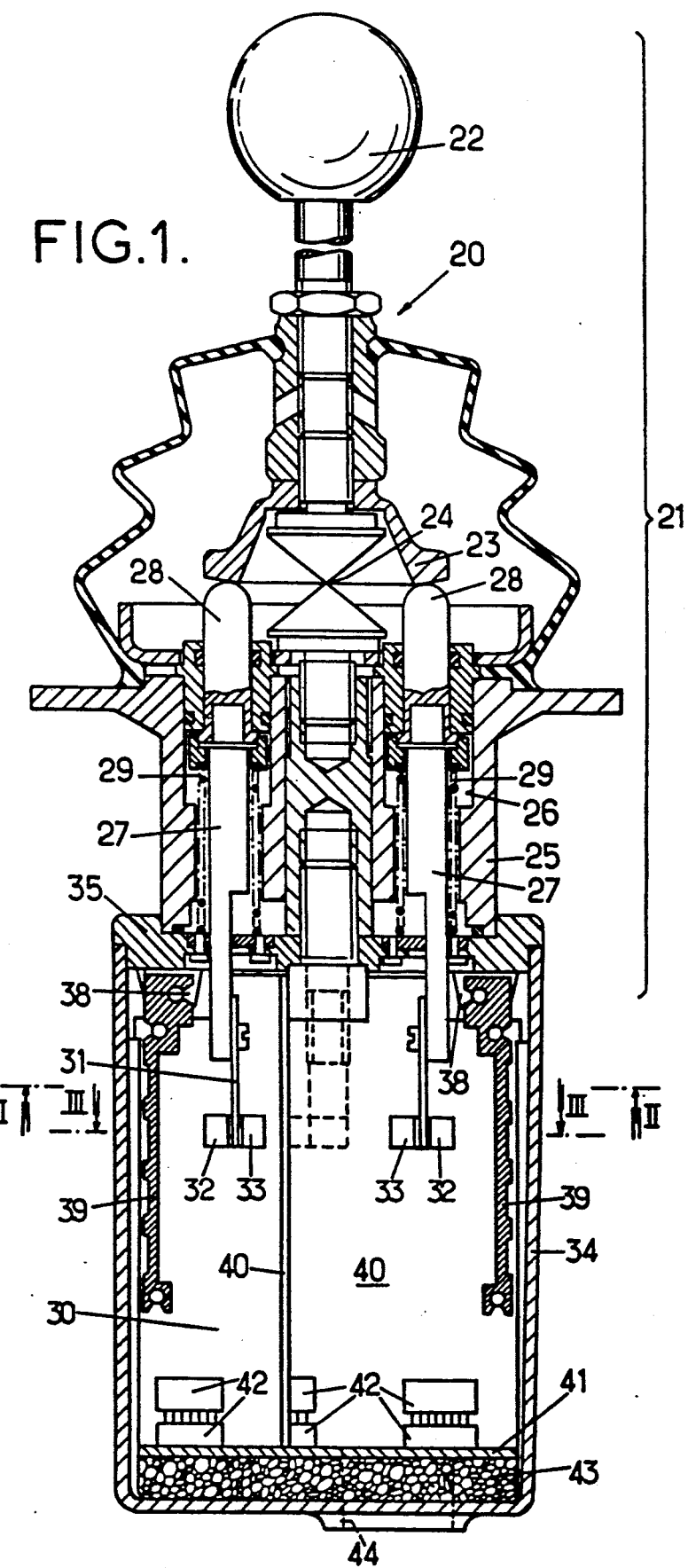

United States Patent [19]

Gerbier et al.

[11] Patent Number: 5,140,320

[45] Date of Patent: Aug. 18, 1992

[54] ELECTRIC REMOTE CONTROL DEVICE INCLUDING PAIRS OF SLIDING PUSHERS

[75] Inventors: Patrick Gerbier, Montluel; Gérard Laroze, Mions; Marc Menvielle, Toulouse, all of France

[73] Assignee: Rexroth-Sigma, France

[21] Appl. No.: 539,568

[22] Filed: Jun. 15, 1990

[30] Foreign Application Priority Data

Jun. 16, 1989 [FR] France ................ 89 08044

[51] Int. Cl.$^5$ ........................... H03K 17/968
[52] U.S. Cl. ................... 341/20; 74/471 XY; 250/231.1
[58] Field of Search ......... 340/870.01, 870.28; 341/20; 74/471 XY; 200/6 A; 250/211 K, 231.10, 231.13

[56] References Cited

U.S. PATENT DOCUMENTS 4,731,530 3/1988 Mikan ................ 250/211 K
4,990,842 2/1991 Miyaoka ................ 200/6 A Primary Examiner—Donald J. Yusko
Assistant Examiner—Michael Horabik
Attorney, Agent, or Firm—Larson & Taylor

[57] ABSTRACT

An electric remote control device (20), includes a metal body (25) containing sliding pushers (27) associated two by two and actuated from an actuating member (22). Each pusher is associated with a converter for generating an electric signal one parameter of which is representative of the movement and/or position of the pusher. A signal processor processes the signal collected at the output of the receiver. At the end of the metal body (25) opposite the actuating member is provided a metal base (35) through which pass the rods of the pushers (27) associated with the converter. At least one printed circuit board (40), supporting the electronic components, in particular those of the converter and the signal processor, is disposed substantially perpendicularly to the base (35) in the central zone thereof, between and/or along the rods of the pushers (27). Supports (39) made from heat conducting material are fixed for heat conducting to the base and support the printed circuit boards. The supports (39) are further disposed in heat conducting contact with electric components of the printed circuit board (40). The base (35) receives a protective casing (34) conferring on the device the same shape and the same dimensions as a known remote control device of the manipulator type or the like with purely fluid operation.

14 Claims, 2 Drawing Sheets

ELECTRIC REMOTE CONTROL DEVICE INCLUDING PAIRS OF SLIDING PUSHERS

The present invention relates to improvements to electric remote control devices of the manipulator type or similar, comprising a metal body containing sliding pushers associated two by two and actuated from an actuating member, particularly manual, each pusher being associated with converter means adapted for generating an electric signal one parameter of which is representative of the movement and/or position of the pusher, signal processing means being provided for processing the signal collected at the output of the receiver.

Such remote control devices find particularly interesting, though not exclusive, application in hydraulic or pneumatic control devices for, while keeping the same control means (for example rocking handle) which in no way modify the habits of users, the connections between said control means and the controlled means (jacks, pumps, for example) are considerably simplified : bundles of electric conductors (mechanically resistant, bendable over small radii and so easy to position, which can be carried out in the workshop before fitting) replace the numerous hydraulic ducts (fragile, not readily bendable, having to be fitted one by one ) : in addition the distance separating the control member from the controlled member is of no importance and the strictly simultaneous actuation of several controlled members from a single control member becomes possible without other complications even if their respective distances apart are very different.

However, the problem arises of constructing an electric remote control device of the above type which corresponds as identically as possible in its shapes, dimensions, fitting sizes, to the purely fluid (hydraulic or pneumatic) remote control devices used up to now so that these electric remote control devices may be mounted on new machines as well as on already existing machines to replace purely fluid remote control devices and without appreciable modifications thereof.

The object of the invention is to provide an original arrangement of the part of the above remote control device reserved for the electronics, which arrangement keeps the shapes, volumes and dimensions of the prior remote control devices with purely fluid function, and even allows the protective casing used in the latter to be kept.

For this, the remote control device in accordance with the invention is essentially characterized :

in that at the end of the metal body opposite the actuating member is provided a metal base through which pass the rods of the pushers associated with the converter means, in that at least one printed circuit board, supporting the electronic components, in particular those of the converter means and the signal processing means, is disposed substantially perpendicularly to the base in the central zone thereof, between and/or along the rods of the pushers, in that supports made from heat conducting material are fixed for heat conducting to the base and support the printed circuit boards, in that said supports are further disposed in heat conducting contact with electric components of the printed circuit board, and in that the base receives a protective casing conferring on the device the same general shape and the same dimensions as a known remote control device of the manipulator type or similar with purely fluid operation.

Advantageously, the base has projecting studs and the supports are fixed laterally on these studs.

Advantageously the supports are situated in the vicinity of the lateral edges of the printed circuit board and the board is fixed laterally by its edges to the supports, which gives ready access to the fixing means (screws for example), without being hindered by the electronic components fixed to the printed circuit board.

In a first possible embodiment concerning a device equipped with a single pair of sliding pushers, there is only one printed circuit board which is disposed parallel to the plane defined by said pushers in the vicinity thereof.

In other possible embodiments concerning a device equipped with more than two sliding pushers, particularly three or four pushers, the printed circuit boards are two in number and are disposed in a cross, in particular an asymmetric cross so that, in the more particular case of a device with four pushers, each board may extend parallel to the plane defined by two opposite pushers. It is also possible to provide a connecting printed circuit board fixed to the free ends of the main boards, perpendicularly thereto, via electric conductors.

With the arrangement in accordance with the invention, in the restricted cylindrical volume defined by the casing of a prior device may be housed not only the radiation transmitters and receivers associated with each variable characteristic element coupled mechanically to the sliding pusher but also all the electronics required for processing the electric signal or signals delivered by the receiver as well as the electronics required for controlling the different functions (calibration, multiple response curves, etc...). The particular arrangement of the board supports and the heat conducting connection which they form with the base, which then serves for heat dissipation, provides the required removal of the heat generated by the electronic components. The position of the boards makes their faces particularly accessible for checking and the means for fixing (for example screws) the cards on the supports, the supports on the base and even the base on the body of the device remain also easy of access despite the presence of the electronic components, which allows ready replacement of the parts.

The configuration selected for mounting the printed circuit boards reduces as much as possible the number thereof, they do not exceed two, even for a remote control device with four pushers : the connections are reduced correspondingly, manufacture of the boards is simplified and, if need be, a single transverse connecting board may be placed at the end, so as to avoid discrete wiring.

In a first possible embodiment, said base is fixed to the metal body : the device is then in the form of a single block, although the different component members may be removed individually for maintenance and/or replacement thereof.

In a second possible embodiment, the base can be fixed to the casing so as to form a unit containing the printed circuit boards which can be fixed removably to the body. The device is then in the form of two separate units — an upper unit containing the mechanical part of the device and a lower unit containing the electric and (electronic part of the device — which can be assembled together; one of them, particularly the electric unit, may thus be readily and rapidly separated from the other, for example for testing and/or replacing it.

In order to protect the device against pollution (dust, oil splashes, ...) in a very severe environment, it is indispensable for the device to be hermetically closed and consequently for the converter casing to be sealingly mounted on the body of the device. Because of the heat released due to the presence of certain electronic components, it is then necessary to provide regulation of the temperature within the enclosure so as to reduce as much as possible the thermal drifts of the electronics. However, heat regulation at a traditional temperature of about 20° C. would require recourse to a cooling device, which is cumbersome and expensive, whose operation would be all the more uncertain since the remote control device may be placed in a hot environment, even very hot (for example manipulator of a public works machine exposed to the sun in a tropical region). Therefore in accordance with the invention the temperature regulation takes place at a relatively high value or within a relatively high range, for example 40° C. or between 40° and 60° C.

Figure 2:
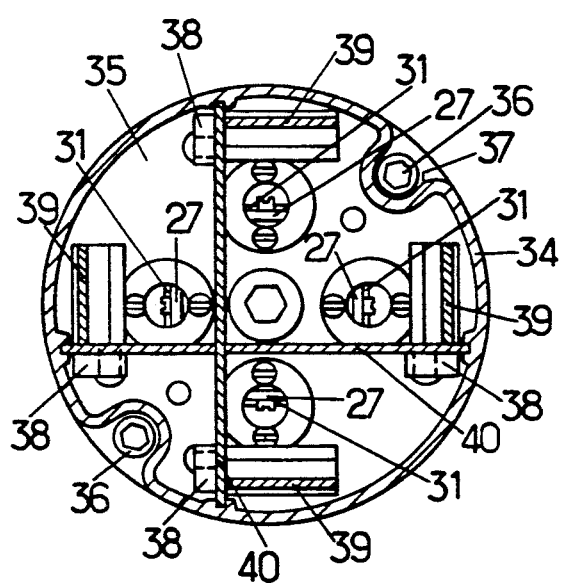
Figure 3:
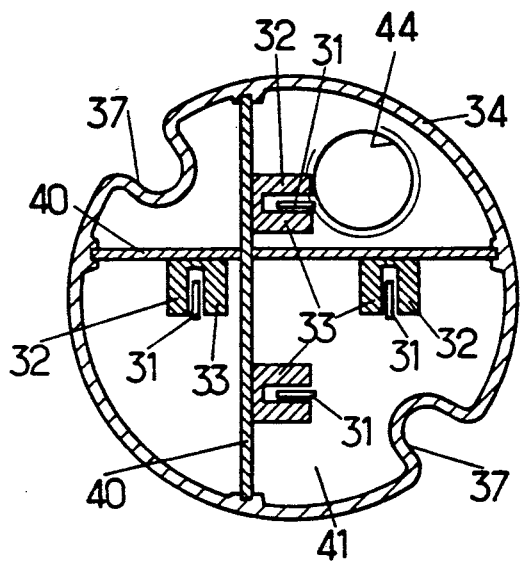

The invention will be better understood from the following description of a preferred embodiment given solely by way of non limitative example, in which description reference is made to the accompanying drawings in which:

FIG. 1 is a side view in section of an electric remote control device arranged in accordance with the invention, and FIGS. 2 and 3 sectional views respectively through lines II—II and III—III of FIG. 1.

In FIG. 1, an electric remote control device of the manipulator type, designated generally by the reference 20, comprises a manual actuating block 21 (upper part of the device 20 in FIG. 1) which is adapted conventionally, in a way known per se, for example for hydraulic manipulators controlling hydraulic slide valves. Briefly, an actuating handle 22, fast with a cam 23, is mounted for pivoting about an axis (in the case of a control of one or two circuits) or about a rocking point (24) in the case of the control of more than two circuits (three or four for example) — case shown in the figure. The metal body 25 which supports handle 22 via its articulation 24 comprises bores 26 with parallel axes, particularly symmetrical with respect to the axis of body 25, and in which are disposed sliding rods or pushers 27 ending, at their upper part (in the figure, in fingers 28 projecting from body 25). Compression springs 29 associated with rods 27 push them permanently upwards so that one of the fingers 28 bears against the cam 23 when the latter is inclined to its side by actuation (leftwards or rightward for example, in FIG. 1) of handle 22.

At the lower part of body 25 is provided an enclosure or chamber 30 in which project the lower ends of rods 27. With each rod 27 is associated a position detection device formed in the following way. At the lower end of rod 27 is rigidly coupled a plate 31 made from material with a longitudinally variable characteristic, in particular preferably variable transparency; plate 31 is adapted for sliding between an infrared radiation transmitter 32 and a receiver 33 disposed facing each other on each side of plate 31 and supported in chamber 30 in the way to be described below.

Actuation of handle 22 causes a corresponding movement of one of rods 27, and so of plate 31 which is associated therewith, and the corresponding receiver 33 delivers an electric signal one parameter of which (for example the amplitude or the frequency) varies in an equivalent way.

The remote control device 20 forms then a proportional control which delivers an electric signal representative of a mechanical movement, which electric signal may be transmitted to a distance, either by wires or by radiation, towards a controlled apparatus. Such an electric remote control device is particularly advantageous for it may be formed economically from inexpensive electronic components (infrared radiation transmitter and receiver), a proportionality member (plate 31) readily manufactured on a large scale at a low cost, for example by photographic means, and a manipulator 21 which is already existing in hydraulic controls for hydraulic valves.

Chamber 30 is defined by a casing 34 having a general substantially cylindrical form of revolution, mounted sealingly on a metal base 35 itself fixed to the end of body 25 and having appropriate passages for the rods 27 of the sliding pushers 28. For example, as shown in FIGS. 2 and 3, casing 34 is fixed to base 35 by screws 36 parallel to the central axis of the device and accessible because of the presence of longitudinal recesses 37 formed by the lateral wall of casing 34.

On its lower face (turned towards chamber 30), base 35 has projecting studs 38, for example four in number in the case of a manipulator with four outputs (four pushers) shown in the figures. On these studs are screwed transversely respective supports 39, made from a heat conducting material, for example from aluminum, which have the general shape of flat elongate shaped pieces or bars extending substantially parallel to the central axis of the device. The mechanical connection between studs and bars is simple.

As can be best seen more particularly in FIG. 2, studs 38 are situated at the periphery of the base 35 and at positions such that the support bars 39 are substantially diametrically opposite two by two, on the same diameters as rods 27 of the pushers, while facing each other. On the support bars are screwed, laterally and by their respective edges, two printed circuit boards 40 disposed in an asymmetric cross, each of these boards extending parallel to the plane defined by two opposite rods 27 and at a distance therefrom; the two boards 40 therefore extend also substantially perpendicular to base 35.

The two boards 40 support all the electronic components required for operation of the device. In particular, they support directly the transmitter 32 –receiver 33 pairs which may be included in a U shaped piece (as shown in FIG. 3) enclosing an associated plate 31. Some components which heat up appreciably during operation (power transistors, integrated circuits) are in heat conducting contact with bars 39 which serve as heat sinks; the heat is then transmitted by the bars to base 35 and body 25 which form high power heat dissipators.

At the free end of the main boards 40 a secondary connecting board 41 may be provided, disposed transversely; such a connecting board is generally without components and, by its own printed tracks, provides the electric connections between the two boards 40, via electric conductors 42 which also provide its mechanical fixing.

Resilient means (for example a foam material block 43) provided at the bottom of casing 34 bear on the connecting board 41 and hold and lock the assembly. An orifice 44, passing through board 41, the foam block 43 and the bottom of casing 34, is provided for the passage of electric wires for connection to outside circuits. In some fields of use, the manipulator may be placed in an aggressive environment likely to affect unfavourably its operation, as is the case particularly for public works equipment.

To protect the device against mechanical shocks and to prevent the ambient humidity from reaching the electronic components (risk of leaks or electric short-circuits) and the photographic film forming the plates 31 (material sensitive to water), it is desirable for casing 34 to be mounted totally sealingly on base 35. Thus, in addition, dust is prevented from settling on the plates 31 and obscuring and/or modifying the variable transparency pattern, and so modifying the law of progressiveness of the control.

However, sealing of the mounting is unfavourable from the heat point of view, for the heat released by the electronic components during operation cannot be removed; not only does the variation of temperature in chamber 30 risk causing a heat drift of the electric signals likely to cause a displacement of the neutral point, but in addition, the photographic film which may form each plate 31 risks being deformed by too high a temperature, with a corresponding modification of the variable transparency pattern.

To avoid this drawback, heat regulation is provided for chamber 30 containing the electronics and the mobile plates 31, using heat regulation means.

To reduce as much as possible the energy required for operating the heat regulation means, it is desirable for such means to provide regulation at a temperature or in a temperature range greater than the nominal ambient temperature (20° C.) : the regulation temperature could advantageously be kept at a value of about 40° C., for example in a range between 35° C. and 45° C., even 40° C. to 60° C.

These heat regulation means may in particular comprise one or more heating resistances, mounted on printed circuit boards.

As is evident, and as it follows already from what has gone before, the invention is in no way limited to those of its modes of application and embodiments which have been more particularly discussed; it embraces, on the contrary, all variants thereof.

In particular, a similar mounting, but simpler, with only a single printed circuit board fixed to two support bars may be provided in the case of a manipulator with two outputs (two pushers). In addition, it will be noted that, in the embodiment shown, the base 35 is fixed directly to the metal body 25, so that the device forms a single block assembly.

The base 35 may however be fixed to casing 34 so as to form a specific unit containing all the electronic and/or electric components which can be removably fixed to body 25. The device is then formed by the assembly of two basic units, namely an upper unit (corresponding to reference 21) which contains all the mechanical part of the device and a lower unit which contains the electronics. These two units, for example screwed or bolted together, have no physical connection other than the fixing means, and so they may be readily and rapidly separated; in particular, the electronic unit may be removed without difficulty whereas the mechanical unit remains in position on the machine, for checking and/or replacement. It will in particular be noted that this structural independence of the two units results from the form chosen for the converter means which transform the movement and/or the position of each pusher into an electric signal : in fact, each of these converter means comprises on the one hand a mobile plate 31 which is fast with the pusher and which belongs therefore structurally to the mechanical unit and, on the other hand, the transmitter 32 and the receiver 33 which are fixed to a printed circuit board and which therefore belong to the electronic unit, although these elements cooperate functionally. The result is a manifest advantage at the manufacturing, mounting and maintenance levels.

We claim:

1. Electric remote control device comprising a metal body containing at least two sliding pushers and actuated from an actuating member, each pusher being associated with converter means for generating an electric signal one parameter of which is representative of the movement and/or position of the pusher, and said remote control device further including signal processing means for processing the signal collected at the output of a receiver of said remote control device, said remote control device further comprising:
   at the end of the metal body opposite the actuating member, a metal base through which pass the rods of the pushers associated with the converter means,
   at least one printed circuit board supporting electronic components and disposed substantially perpendicularly to the base in the central zone thereof, between and/or along the rods of the pushers, and
   supports made from heat conducting material, fixed to the base for heat conducting and supporting at least one printed circuit board,
   said supports being further disposed in heat conducting contact with said electric components of the printed circuit board,
   and said metal base receiving an external protective casing.

2. Remote control device according to claim 1, characterized in that the base has projecting studs and in that the supports are fixed laterally on these studs.

3. Remote control device according to claim 1, characterized in that the supports are situated in the vicinity of the lateral edges of the printed circuit board and in that the board is fixed laterally by its edges to the supports.

4. Remote control device according to claim 1, equipped with a single pair of sliding pushers, characterized in that there is only one printed circuit board which is disposed parallel to the plane defined by said pushers in the vicinity thereof.

5. Remote control device according to claim 1, equipped with at least three pushers, characterized in that the printed circuit boards are two in number and are disposed in a cross.

6. Remote control device according to claim 5, characterized in that the two boards form an asymmetric cross.

7. Remote control device according to claim 5, equipped with four pushers, characterized in that each board extends parallel to and in the vicinity of the plane defined by a pair of opposite pushers.

8. Remote control device according to claim 5, further comprising a connecting board fixed to the free ends of the at least one printed circuit board, perpendicularly thereto, via electric conductors.

9. Remote control device according to claim 1, characterized in that, for each pusher, the converter means comprises a mobile element fast with the pusher and having a transparency varying between a maximum mean value towards one of its ends and a minimum mean value towards its opposite end and a radiation transmitter and receiver facing each other mutually and between which the mobile element is disposed so that said mobile element modifies correspondingly a parameter of the radiation received by the receiver, in that the transmitters and receivers are fixed to the at least one printed circuit board and in that the at least one circuit board is disposed so that each mobile element fast with a pusher may slide freely between the transmitter and the corresponding receiver.

10. Remote control device according to claim 1, characterized in that the base is fixed to the metal body, the device being in the form of a single block.

11. Remote control device according to claim 1, characterized in that the base is fixed to the casing so as to form a unit containing the at least one printed circuit board and which is fixed removably to the body.

12. Remove control device according to claim 1, characterized in that the external protective casing contains the at least one printed circuit board and is hermetically closed, and in that means are provided for regulating the temperature within the external protective casing.

13. Remote control device according to claim 12, characterized in that the temperature regulation means are adapted for maintaining the temperature of the enclosure close to a predetermined relatively high temperature or in a relatively high temperature range.

14. Electric remote control device according to claim 1, characterized in that the metal body has bores with parallel axes in which said sliding pushers are fitted and disposed, these pushers being actuated by oscillating cam means fast with the actuating member and being pushed into abutment against said cam means by respective resilient means.

* * * * *